N. J. CUNNINGHAM.
BUNDLE ATTACHMENT FOR AUTOMOBILE TOPS.
APPLICATION FILED NOV. 23, 1915.
1,196,762. Patented Sept. 5, 1916.
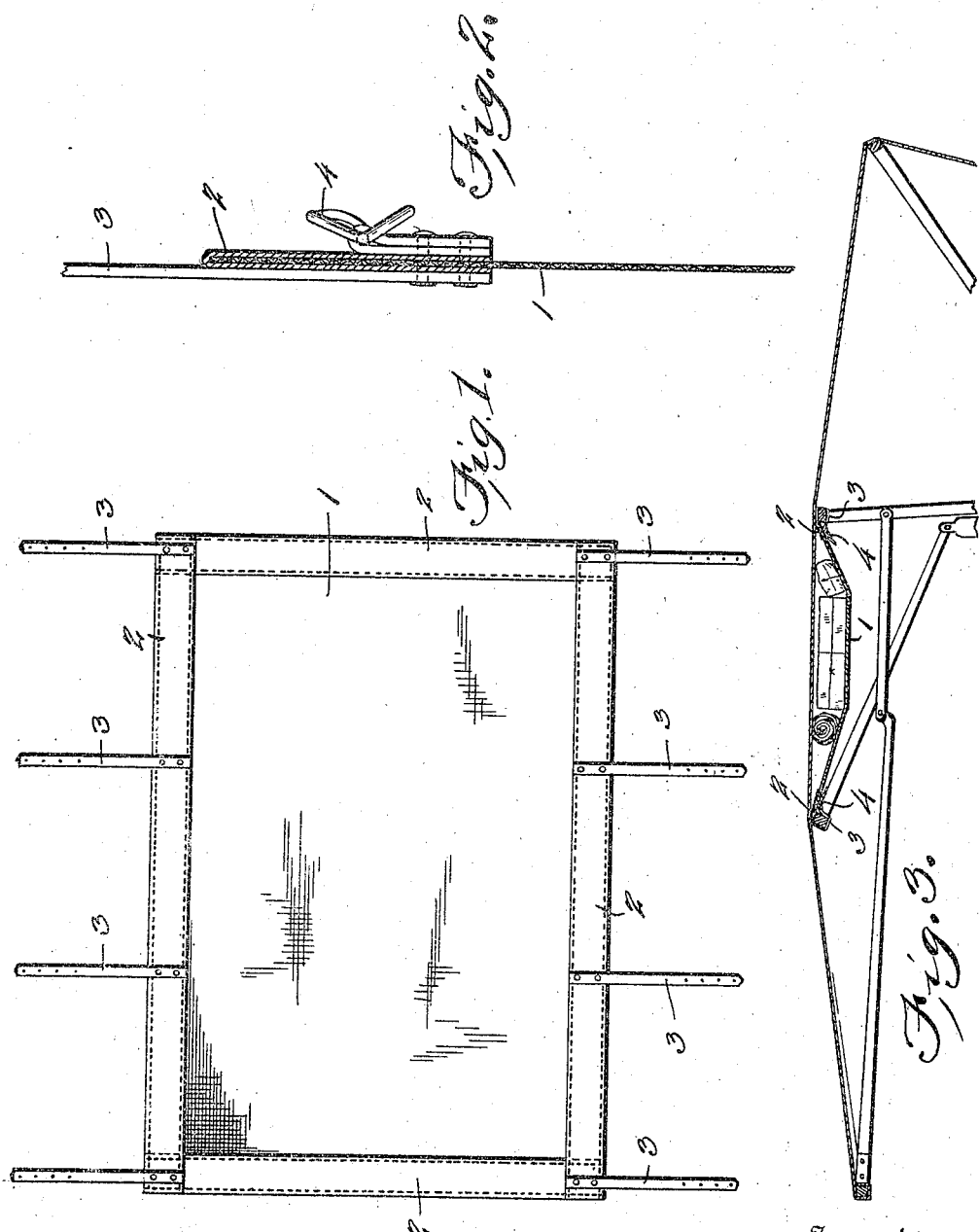

UNITED STATES PATENT OFFICE.

NAPOLEON J. CUNNINGHAM, OF DEFIANCE, OHIO.

BUNDLE ATTACHMENT FOR AUTOMOBILE-TOPS.

1,196,762.   Specification of Letters Patent.   Patented Sept. 5, 1916.

Application filed November 23, 1915. Serial No. 63,121.

*To all whom it may concern:*

Be it known that I, NAPOLEON J. CUNNINGHAM, a citizen of the United States, residing at Defiance, in the county of Defiance and State of Ohio, have invented a new and useful Bundle Attachment for Automobile-Tops, of which the following is a specification.

It is the object of my invention to provide a novel bundle attachment adapted to be adjustably attached to automobile tops, and which is so constructed as to be readily detachable.

I attain the objects of my invention by the mechanism illustrated in the accompanying drawings, in which—

Figure 1 is a top plan; Fig. 2 is a section showing the fastening means; and Fig. 3 is a longitudinal section of the attachment applied to an automobile top.

Like characters of reference designate like parts throughout the several views.

Referring to the accompanying drawings, I provide a bundle containing member 1 of any suitable material such as mohair or canvas, having suitable reinforcing border strips 2, and suitable spaced straps 3, and suitable buckles 4 attached to the shanks of straps 3, as illustrated. Border strips 2, which overlap the edges of member 1 afford a reinforced or strengthened portion for the attachment of straps 3 and buckles 4. Straps 3 may be of any suitable material, such as leather or canvas.

In use, the bundle attachment is secured to the transverse rods of the automobile top frame by means of straps 3 and buckles 4, as illustrated. The attachment is readily detachable. It affords a novel and convenient means for the disposition of bundles in automobiles. When not in use it can be detached and placed in a suitable carrier or can be folded back and attached to the top.

What I claim is:

A bundle attachment for automobile tops adapted to be supported wholly from the transverse rods of the automobile top frame and comprising a bundle carrying flexible strip, opposite reinforcing border strips positioned on all sides of the border of the main strip, fastening straps attached to the main strip, and corresponding buckle straps positioned on the opposite side of the main strip to that to which the fastening straps are attached to coöperate therewith and secured over the reinforced border strips, as shown.

NAPOLEON J. CUNNINGHAM.

Witnesses:
E. W. COSTELLO,
BLANCHE CAMERON.